(12) United States Patent
Choi et al.

(10) Patent No.: US 9,341,332 B2
(45) Date of Patent: May 17, 2016

(54) LIGHT SOURCE APPARATUS

(71) Applicant: LG ELECTRONICS INC., Seoul (KR)

(72) Inventors: Youngsoo Choi, Seoul (KR); Hong Lyeol Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 14/465,341

(22) Filed: Aug. 21, 2014

(65) Prior Publication Data
US 2015/0062908 A1   Mar. 5, 2015

(30) Foreign Application Priority Data

Aug. 27, 2013 (KR) .................. 10-2013-0101848

(51) Int. Cl.
*F21S 10/00* (2006.01)
*G03B 21/20* (2006.01)
*G03B 33/08* (2006.01)
*H04N 9/31* (2006.01)

(52) U.S. Cl.
CPC ............. *F21S 10/007* (2013.01); *G03B 21/204* (2013.01); *G03B 21/2013* (2013.01); *G03B 33/08* (2013.01); *H04N 9/3158* (2013.01)

(58) Field of Classification Search
CPC .. G03B 21/2013; G03B 21/204; G03B 33/08; F21S 10/007; H04N 9/3158
USPC ......... 362/280, 281, 282, 283, 284, 322, 323, 362/324, 84
See application file for complete search history.

(56) References Cited

U.S. PATENT DOCUMENTS

| | | | | |
|---|---|---|---|---|
| 4,800,474 A * | 1/1989 | Bornhorst | ............ | F21S 10/007 359/889 |
| 5,060,126 A * | 10/1991 | Tyler | ............ | F21S 10/007 359/889 |
| 6,011,662 A * | 1/2000 | Evans | ............ | F21S 10/007 359/885 |
| 6,078,443 A * | 6/2000 | Yu | ............ | F21S 10/007 359/892 |
| 6,999,253 B1 * | 2/2006 | Niwa | ............ | G02B 26/008 348/743 |
| 7,942,535 B2 * | 5/2011 | Kjaer | ............ | G03B 21/14 348/743 |
| 8,684,560 B2 * | 4/2014 | Sugiyama | ............ | F21S 10/007 362/284 |
| 8,752,985 B2 * | 6/2014 | Quadri | ............ | F21S 10/007 359/813 |
| 8,944,646 B2 * | 2/2015 | Quadri | ............ | F21S 10/007 359/893 |
| 2009/0109681 A1 * | 4/2009 | Jurik | ............ | F21S 10/007 362/284 |
| 2013/0038736 A1 * | 2/2013 | Yamamura | ............ | B60Q 1/143 348/148 |
| 2014/0104841 A1 * | 4/2014 | Huang | ............ | F21V 13/08 362/263 |
| 2014/0118991 A1 * | 5/2014 | Lin | ............ | G02B 26/008 362/84 |

* cited by examiner

*Primary Examiner* — Laura Tso
(74) *Attorney, Agent, or Firm* — Birch, Stewart, Kolasch & Birch, LLP

(57) ABSTRACT

The present disclosure provides a light source apparatus, the apparatus including a light source configured to irradiate an excitation light, an optical system configured to form the excitation light, and a phosphor wheel configured to separate a plurality of colors based on the formed excitation light, wherein the phosphor wheel includes a first separation portion of light-transmitting material assembled as a separate element penetrable by a blue light of the excitation light, and integrally formed second to fourth separation portions having phosphor layer configured to reflect red, green and yellow of the excitation light.

14 Claims, 4 Drawing Sheets

LIGHT SOURCE APPARATUS

Pursuant to 35 U.S.C. §119 (a), this application claims the benefit of earlier filing date and right of priority to Korean Patent Application No. 10-2013-0101848, filed on Aug. 27, 2013, the contents of which is hereby incorporated by reference in their entirety.

FIELD OF THE INVENTION

The teachings in accordance with the exemplary embodiments of this present disclosure generally relate to a light source apparatus used for a beam projector.

DESCRIPTION OF RELATED ART

Recently, data projectors are widely used to project images displayed on a screen of a personal computer, images created by video signals and, furthermore, images by image data stored in a memory card on to a screen.

In many cases, the data projectors are constructed such that a light source unit including a small high-intensity discharge lamp such as a metal halide lamp or an extra-high pressure mercury lamp is used and light emitted from the light source unit is divided into the three primary colors by a color filter for so as to be emitted on to a liquid crystal display device or a display device referred to as a DMD (Digital Micro-mirror Device) by a light source-side optical system, whereby the light passing through or reflected on the display device is projected on to a screen via a lens group known as a projection-side optical system including a zooming function.

In the data projectors thus discussed, although a small high-intensity discharge lamp is conventionally used as a main light source, a light source has been recently developed that uses an LED (Light Emitting Diode), a laser diode, an organic EL (electroluminescence) and/or phosphor luminescent material. By way of example, Japanese Laid-Open Patent No.:2004-341105 discloses a disk-shaped phosphor wheel formed with a phosphor layer converted to visible light by receiving ultraviolet as an excitation light emitted from a solid state light source, and a light source apparatus having a solid state light source.

The solid state light source may be variably formed. By way of example, when blue laser diode is used as light source, a phosphor layer of the phosphor wheel is cut out on a blue section to allow the light from the light source to pass the phosphor wheel when forming a light of blue color. At this time, because the disk-shaped phosphor wheel coated at the blue section is rotated at a high speed, the phosphor wheel may generate an abnormal operating movement at the coated section while contacting air, which in return generates a noise from a motor rotating the phosphor wheel, causing inconveniences to a user.

SUMMARY OF THE DISCLOSURE

An exemplary embodiment of the present disclosure is to provide a light source apparatus configured to improve a structure of a phosphor wheel by minimizing a noise that is generated during operation.

In one general aspect of the present disclosure, there is provided a light source apparatus, the apparatus comprising: a light source configured to irradiate an excitation light; an optical system configured to form the excitation light; and a phosphor wheel configured to separate a plurality of colors based on the formed excitation light; wherein the phosphor wheel includes a first separation portion of light-transmitting material assembled as a separate element penetrable by a blue light of the excitation light, and integrally formed second to fourth separation portions having phosphor layer configured to reflect red, green and yellow of the excitation light.

Preferably, but not necessarily, the phosphor wheel may include a hub rotatably mounted on an output axis of a motor, and a disk body coupled to the hub, wherein the first to fourth separation portions are coupled to the disk body to form a disk shape.

Preferably, but not necessarily, the first separation portion may be provided to have a pair of linear surfaces and a pair of curved surfaces each having a same radius of curvature, and the first separation portion may be adhesively fixed to any one of the hub and the disk body.

Preferably, but not necessarily, the disk body may be formed with any one of resin material and a metal material.

Preferably, but not necessarily, an area of the third separation portion may be formed greater than that of the fourth separation portion.

Preferably, but not necessarily, the optical system may include a dichroic mirror configured to transmit a blue light and reflect red, green and yellow lights.

Preferably, but not necessarily, the apparatus may further comprise a color filter formed with a plurality of glass filters.

Preferably, but not necessarily, a rotation shaft of the phosphor wheel may be arranged perpendicular to a rotation shaft of the color wheel.

Preferably, but not necessarily, the light source may be provided in a semiconductor light source or a blue laser diode.

Preferably, but not necessarily, the first separation portion may include a blue diffusion layer.

Advantageous Effects of the Disclosure

The light source apparatus according to an exemplary embodiment of the present disclosure has an advantageous effect in that a passage region of blue light is formed free from coated section to prevent an abnormal movement from occurring at the time of phosphor wheel being rotated and to reduce generation of noise.

Another advantageous effect is that a transparent filter part assembled to the phosphor wheel is fixed by color wheel manufacturing method to obtain reliability and mass-productibility of the phosphor wheels.

DETAILED DESCRIPTION OF THE DISCLOSURE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Figure 1:
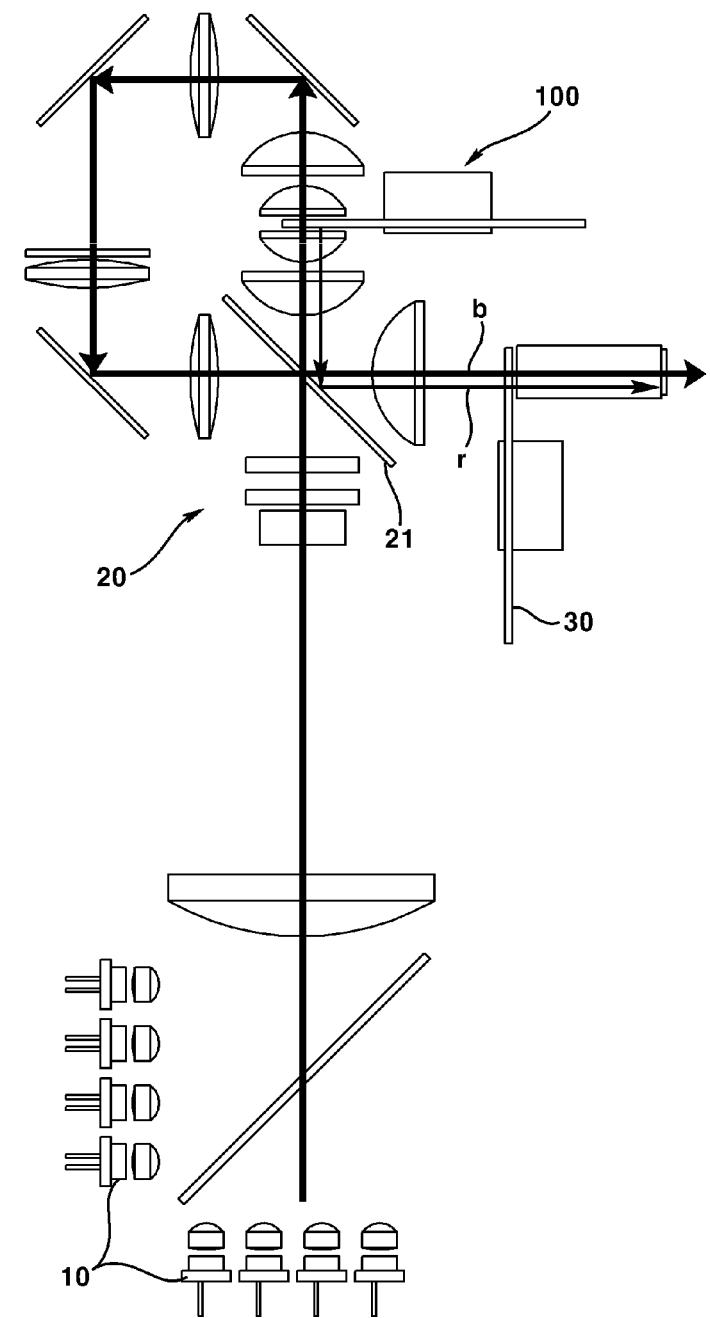
FIG. 1 is a schematic view illustrating a configuration of a light source apparatus according to an exemplary embodiment of the present disclosure.
Figure 2:
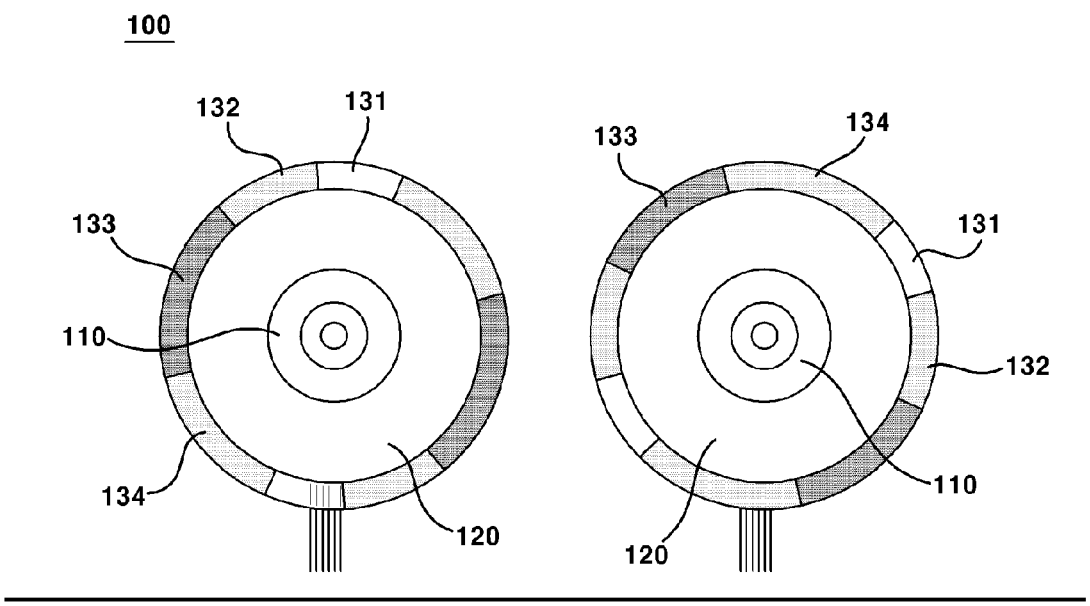
FIG. 2 is a plan view illustrating a phosphor wheel according to an exemplary embodiment of the present disclosure.
Figure 3:
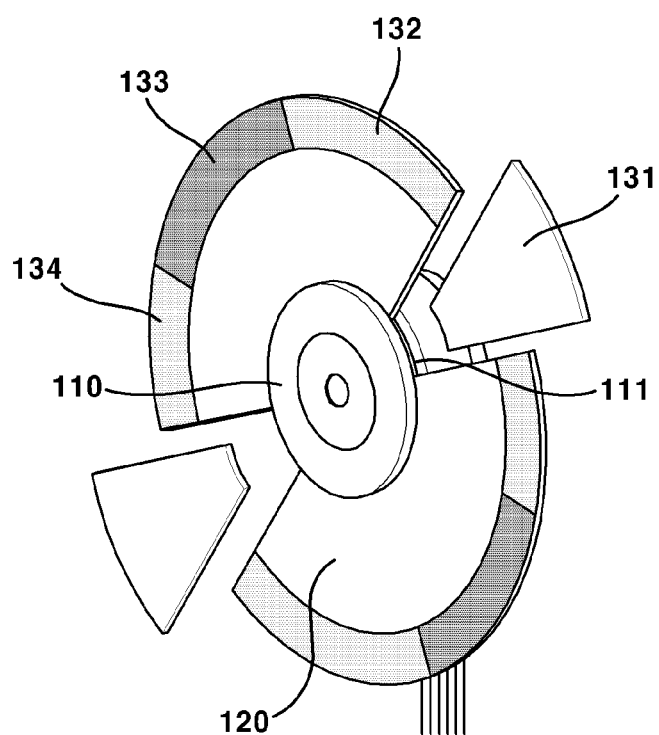
FIG. 3 is an exploded perspective view illustrating a phosphor wheel according to an exemplary embodiment of the present disclosure.
Figure 4:
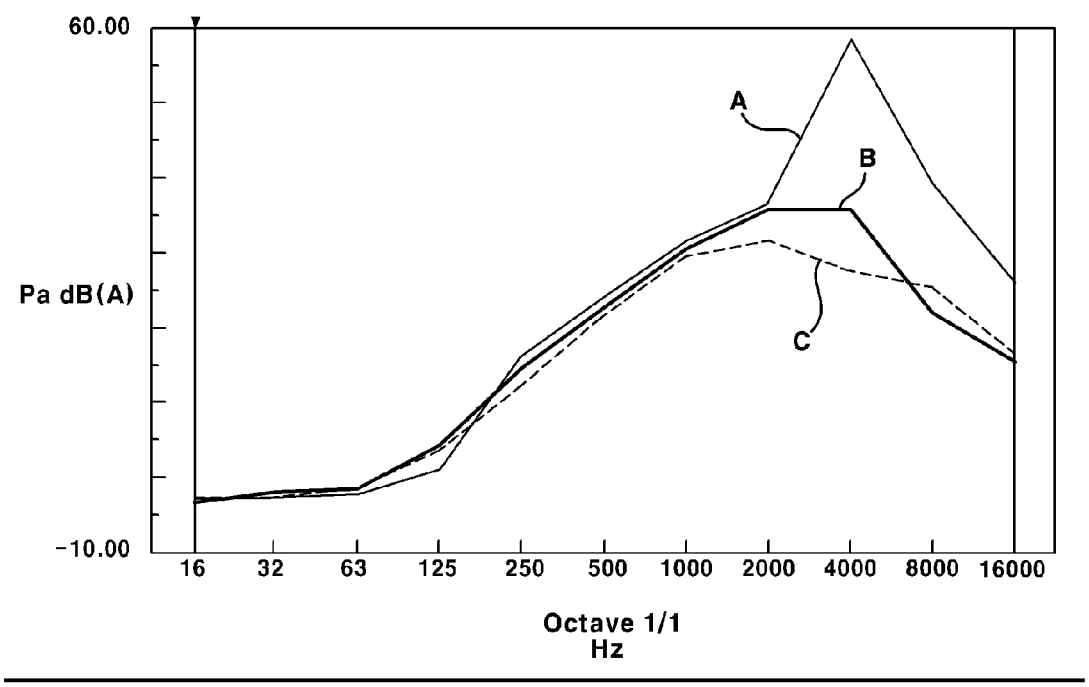
FIG. 4 is a graph that compares noise between a conventional phosphor wheel and a phosphor wheel according to an exemplary embodiment of the present disclosure.

FIG. 1 is a schematic view illustrating a configuration of a light source apparatus according to an exemplary embodiment of the present disclosure, FIG. 2 is a plan view illustrating a phosphor wheel according to an exemplary embodiment of the present disclosure, FIG. 3 is an exploded perspective view illustrating a phosphor wheel according to an exemplary embodiment of the present disclosure, and FIG. 4 is a graph that compares noise between a conventional phosphor wheel and a phosphor wheel according to an exemplary embodiment of the present disclosure.

Referring to FIG. 1, the light source apparatus according to an exemplary embodiment of the present disclosure includes a light source 10 configured to irradiate an excitation light, an optical system 20, and a color wheel 30 configured to have a wavelength conversion material including an organic or inorganic pigment, and a phosphor wheel 100 having a rotation shaft perpendicular to a rotation shaft of the color wheel 30 may be also arranged.

A light generated from the light source 10, which is an excitation light, is separated/converted to a plurality of colors by the phosphor wheel 100 and the color wheel 30, where the converted plurality of colors may pass a light integrator for scrambling having intensity homogenization. The light source 10 may be formed with a solid state light source including a laser diode or an LED. It is preferable that a blue laser diode be used for an exemplary embodiment of the present disclosure.

For example, when the light source 10 and the optical system 20 are mounted on a projection apparatus, an optical system 20-passed light scrambled by a delay optical system and a prism may be transmitted to a micro display imager. The light converted by the micro display imager may be projected don a display screen through a projection lens. A multi-colored image can be obtained by synchronization between the micro display imager and the color wheel 30.

The color wheel 30 may include a plurality of segments, where red, green, blue and yellow segments are generally coated with wavelength conversion materials formed with mutually different colors of phosphor layers. Each angular size of the segments may be same or different. The blue segment may be a simple transparent material without blue wavelength conversion material due to its being a blue light. The yellow segment includes only the yellow phosphor material to generate a yellow light. The red and green segments may be also operated in the like manner.

Meanwhile, as illustrated in FIG. 1, the light emitted from the light source 10 prior to the light being incident on the color wheel 30 may be sequentially separated in colors by the phosphor wheel 100. The phosphor wheel 100 may be formed with a plurality of color phosphor layers, where the light emitted from the light source 10 may be sequentially irradiated to the color phosphor layers in response to rotation of the phosphor wheel 100, and as a result, colors may be sequentially separated according to the colors of the color phosphor layers.

The phosphor wheel 100 according to an exemplary embodiment of the present disclosure may be provided in a shape of a disk and may include a hub 110, a disk body 120, and first to four separation portions 131, 132, 133, 134. The hub 110 is rotatatively formed on an output shaft of a motor configured to rotate the phosphor wheel 100, and fixes the disk body 120. The disk body 120 may be formed with a resin material or a metal material, may have a transmittance and may have a light blocking property. The disk body 120 may be arranged with the first to four separation portions 131, 132, 133, 134. According to the exemplary embodiment of the present disclosure, only the first separation portion 131 is allowed to be coupled to the disk body 120, and second to fourth separation portions 132, 133, 134 are integrally formed with the disk body 120.

The first separation portion 131 may be formed with a light transmissive material such as glass or plastic, and when the first separation portion 131 is may penetrate a light of blue bandwidth when the light source 10 is formed with a blue laser diode. Furthermore, the first separation portion 131 may include a blue diffusion layer configured to diffuse a light transmissive material and a light, whereby the first separation portion may become further transparent.

Referring to FIG. 3, the first separation portion 131 according to an exemplary embodiment of the present disclosure may be formed with separate elements to be coupled to the hub 110. At this time, the first separation portion 131 may take an approximately trapezoidal shape where a surface corresponding to the hub 110 is formed smaller than a periphery. The first separation portion 131 may be provided in a pair, where each of the first separation portion 131 may be diagonally formed at a 180° apart about the hub 110.

Furthermore, thickness of the first separation portion 131 may be correspondingly formed to that of the second to fourth separation portions 132, 133, 134 (described later). When the first separation portion 131 is assembled to the second to fourth separation portions 132, 133, 134, the first to fourth separation portions 131, 132, 133, 134 can form a complete disk shape each having a same thickness.

Although FIG. 3 has illustrated and explained that the first separation portion 131 is formed to constitute a part of the disk body 120, the present disclosure is not limited thereto, and the disk body 120 may maintain the disk shape, while a distal end of the first separation portion 131 formed with the second to fourth separation portions 132, 133, 134 (phosphor layers) may be assembled with a separate element.

The second to fourth separation portions 132, 133, 134 (phosphor layers) may be provided with the phosphor layers each formed on a surface of the disk body 120 of resin or metal material, and may be formed with a mixture of a light transmissive material such as plastic including glass, crystal and PMMA (Polymethyl Methacrylate) and a phosphor material.

The second separation portion 132 may be directly formed on a surface of the disk body 120, or may include a phosphor layer formed by mixing a light transmissive material (e.g., glass composition) and a red phosphor material as a red phosphor layer that is separately assembled and coupled.

The third separation portion 133 may be directly formed on a surface of the disk body 120, or may include a phosphor layer formed by mixing a light transmissive material (e.g., glass composition) and a green phosphor material as a green phosphor layer that is separately assembled and coupled.

The fourth separation portion 134 may be directly formed on a surface of the disk body 120, or may include a phosphor layer formed by mixing a light transmissive material (e.g., glass composition) and a yellow phosphor material as a yellow phosphor layer that is separately assembled and coupled.

As noted from the foregoing, although blue, red, green and yellow colors may be separated and emitted from the first to four separation portions 131, 132, 133, 134, the present disclosure is not limited thereto, and the fourth separation portion 134 separating the yellow light may be omitted.

Furthermore, each of the second to fourth separation portions 132, 133, 134 may be provided in a pair having a same angular size as that of the first separation portion 131, and may be diagonally arranged at a 180° apart about the hub 110.

Meantime, an area of the third separation portion, which is a green phosphor layer among the color phosphor layers formed on the phosphor wheel 100, is preferably formed greater than that of the fourth separation portion forming the yellow phosphor layer, whereby the brightness of white light emitted during later photosynthesis at a photosynthesis portion can be enhanced.

FIG. 4 is a graph that compares noise between a conventional phosphor wheel and a phosphor wheel according to an exemplary embodiment of the present disclosure.

A thin curved line (A) on the graph indicates a noise level of a phosphor wheel having a configuration in which a relevant portion is coated for passage of blue light, and the thick curved line (B) indicates a noise level of the phosphor wheel 100 according to an exemplary embodiment of the present disclosure, and a dotted curved line (C) indicates a noise level of a disk-shaped conventional phosphor wheel. As illustrated in the graph, it can be confirmed that a sensitive region bandwidth within an equal loudness curve is decreased in noise level in 3 to 5 k Hz bands over the conventional structure indicated as A curved line.

Now, operation of an exemplary embodiment according to the present disclosure will be described hereinafter.

The light emitted from the light source 10 may be collimated to be formed on the phosphor wheel 100. At this time, the blue light, as illustrated in an arrow (b), may be outputted through the color wheel 30 by passing the first separation portion 131, passing a light path formed with a plurality of lenses, and passing a dichroic mirror filter 21. Meanwhile, the red, green and yellow lights, as illustrated in an arrow (r), may be outputted by passing the color wheel 30 by being reflected from the second to fourth separation portions 132, 133, 134, and reflected from the dichroic mirror filter 21.

As discussed above, when the phosphor wheel 100 is formed in a complete round disk shape, no resonant noise caused by abnormal movement can be generated by minimizing a friction with air even in a high speed rotation.

Meantime, the light source apparatus thus configured may be mounted on a light transmissive image display device to allow emitting a projection image, where although the light transmissive image display device is exemplified as a projector, the present disclosure is not limited thereto and various other examples are possible. Furthermore, the light source apparatus according to the exemplary embodiment of the present disclosure may be mounted in other electronic devices. By way of example, the light source apparatus according to the exemplary embodiment of the present disclosure may be mounted in mobile terminals such as mobile phones, smart phones, tablet PCs, notebook computers, PDAs (Personal Digital Assistants) and PMPs (Portable Multimedia Players) as a light projection image display device.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

What is claimed is:

1. A light source apparatus, the apparatus comprising:
a light source configured to irradiate an excitation light;
an optical system configured to form the excitation light; and
a phosphor wheel configured to separate a plurality of colors based on the formed excitation light; wherein
the phosphor wheel includes a first separation portion of light-transmitting material assembled as a separate element penetrable by a blue light of the excitation light, and integrally formed second to fourth separation portions having phosphor layer configured to reflect red, green and yellow of the excitation light.

2. The light source apparatus of claim 1, wherein the phosphor wheel includes a hub rotatably mounted on an output axis of a motor, and a disk body coupled to the hub, wherein the first to fourth separation portions are coupled to the disk body to form a disk shape.

3. The light source apparatus of claim 2, wherein the first separation portion is provided to have a pair of linear surfaces and a pair of curved surfaces each having a same radius of curvature, and the first separation portion is adhesively fixed to any one of the hub and the disk body.

4. The light source apparatus of claim 2, wherein the disk body is formed with any one of resin material and a metal material.

5. The light source apparatus of claim 1, wherein an area of the third separation portion is formed greater than that of the fourth separation portion.

6. The light source apparatus of claim 1, wherein the optical system includes a dichroic mirror configured to transmit a blue light and reflect red, green and yellow lights.

7. The light source apparatus of claim 1, further comprising a color filter formed with a plurality of glass filters, and a rotation shaft of the phosphor wheel is arranged perpendicular to a rotation shaft of the color wheel.

8. The light source apparatus of claim 2, wherein a pair of first separation portions is diagonally formed about the hub and the disk body.

9. The light source apparatus of claim 1, wherein the first separation portion is formed smaller than that of the second and fourth separation portions.

10. The light source apparatus of claim 1, wherein each thickness of first to fourth separation portions is identically formed.

11. The light source apparatus of claim 2, wherein the first to fourth separation portions are formed each in pair.

12. The light source apparatus of claim 11, wherein each of the first to fourth separation portions is arranged in a diagonal structure about the hub and the disk body.

13. The light source apparatus of claim 11, wherein each of the first to fourth separation portions is formed smaller than an area of the disk body.

14. The light source apparatus of claim 11, wherein the first to fourth separation portions are provided in a ring shape under an assembly state.

\* \* \* \* \*